United States Patent
Suzuki (10) Patent No.: US 7,843,154 B2
(45) Date of Patent: Nov. 30, 2010

(54) MOTOR CONTROLLER AND ELECTRIC POWER STEERING APPARATUS

(75) Inventor: Hiroshi Suzuki, Okazaki (JP)

(73) Assignee: JTEKT Corporation, Osaka (JP)

(*) Notice: Subject to any disclaimer, the term of this patent is extended or adjusted under 35 U.S.C. 154(b) by 366 days.

(21) Appl. No.: 12/036,614

(22) Filed: Feb. 25, 2008

(65) Prior Publication Data
US 2008/0203958 A1 Aug. 28, 2008

(30) Foreign Application Priority Data
Feb. 26, 2007 (JP) ............... 2007-046104

(51) Int. Cl.
*H02P 21/00* (2006.01)
(52) U.S. Cl. ............... 318/400.02; 318/400.15; 318/400.23; 318/432; 318/638
(58) Field of Classification Search ........... 318/400.02, 318/400.15, 400.23, 432, 629, 632, 638; 180/65.1, 65.3, 65.8, 298
See application file for complete search history.

(56) References Cited

U.S. PATENT DOCUMENTS

| | | | |
|---|---|---|---|
| 4,251,846 A | 2/1981 | Pearson et al. | |
| 4,697,130 A | 9/1987 | Dadpey et al. | |
| 5,365,153 A | 11/1994 | Fujita et al. | |
| 5,488,281 A | 1/1996 | Unsworth et al. | |
| 5,689,170 A | 11/1997 | Ishikawa | |
| 5,752,209 A | 5/1998 | Nishimoto et al. | |
| 6,037,741 A | 3/2000 | Yamada et al. | |
| 6,130,494 A | 10/2000 | Schöb | |
| 6,297,574 B1 | 10/2001 | Schöb et al. | |
| 6,456,946 B1 | 9/2002 | O'Gorman | |
| 6,504,336 B2 | 1/2003 | Sakamaki | |

(Continued)

FOREIGN PATENT DOCUMENTS

EP 1 308 368 A2 5/2003

(Continued)

OTHER PUBLICATIONS

U.S. Appl. No. 12/024,647, filed Feb. 1, 2008, Suzuki.

(Continued)

*Primary Examiner*—Walter Benson
*Assistant Examiner*—Thai Dinh
(74) *Attorney, Agent, or Firm*—Oblon, Spivak, McClelland, Maier & Neustadt, L.L.P.

(57) ABSTRACT

A second computing section executing a compensation control is provided with a third computing section computing a d-axis correction amount, and a fourth computing section computing a q-axis correction amount. The respective computing sections compute a d-axis correction amount and a q-axis correction amount on the basis of an arithmetic expression constituted by a first term obtained by multiplying a correction coefficient relating to an object axis by a q-axis current command value and a second term obtained by multiplying a correction coefficient relating to an auxiliary axis by a d-axis current command value. The second computing section computes a d-axis current command value and a q-axis current command value which do not generate a torque ripple caused by a distortion of an induced voltage waveform, by adding the d-axis correction amount and the q-axis correction amount to the d-axis current command value and the q-axis current command value.

8 Claims, 3 Drawing Sheets

U.S. PATENT DOCUMENTS

| | | | |
|---|---|---|---|
| 6,639,379 B2 * | 10/2003 | Matsushita et al. | 318/727 |
| 6,741,060 B2 | 5/2004 | Krefta et al. | |
| 6,927,548 B2 * | 8/2005 | Nishizaki et al. | 318/432 |
| 7,005,822 B1 | 2/2006 | O'Gorman et al. | |
| 7,084,601 B2 | 8/2006 | Maeda et al. | |
| 7,091,684 B2 | 8/2006 | Kobayashi et al. | |
| 7,141,948 B2 | 11/2006 | Kifuku et al. | |
| 7,161,317 B2 | 1/2007 | Matsushita et al. | |
| 7,161,323 B2 | 1/2007 | Ajima et al. | |
| 7,188,702 B2 * | 3/2007 | Takagi et al. | 180/446 |
| 7,193,388 B1 | 3/2007 | Skinner et al. | |
| 7,199,538 B2 | 4/2007 | Kameya | |
| 7,240,761 B2 * | 7/2007 | Nagase et al. | 180/443 |
| 7,298,109 B2 | 11/2007 | Sakamaki et al. | |
| 7,321,216 B2 | 1/2008 | Suzuki | |
| 7,348,756 B2 | 3/2008 | Ma et al. | |
| 7,394,214 B2 | 7/2008 | Endo et al. | |
| 7,414,425 B2 | 8/2008 | O'Gorman et al. | |
| 7,439,693 B2 | 10/2008 | Shoda et al. | |
| 7,459,879 B2 | 12/2008 | Kezobo et al. | |
| 7,474,067 B2 * | 1/2009 | Ueda et al. | 318/432 |
| 2002/0145837 A1 | 10/2002 | Krefta et al. | |
| 2005/0125124 A1 | 6/2005 | Nagase et al. | |
| 2008/0067960 A1 | 3/2008 | Maeda et al. | |
| 2009/0192665 A1 | 7/2009 | Nozawa | |

FOREIGN PATENT DOCUMENTS

| | | |
|---|---|---|
| EP | 1 625 991 A | 2/2006 |
| JP | 2004-328814 | 11/2004 |

OTHER PUBLICATIONS

U.S. Appl. No. 12/036,670, filed Feb. 25, 2008, Suzuki.
U.S. Appl. No. 12/036,733, filed Feb. 25, 2008, Suzuki.
U.S. Appl. No. 12/128,304, filed May 28, 2008, Suzuki.
U.S. Appl. No. 12/139,054, filed Jun. 13, 2008, Suzuki.
U.S. Appl. No. 12/209,524, filed Sep. 12, 2008, Suzuki.
U.S. Appl. No. 12/212,165, filed Sep. 17, 2008, Suzuki.
Notice of Allowance dated Aug. 23, 2010, in co-pending U.S. Appl. No. 12/036,670.
Notice of Allowance issued in related U.S. Appl. No. 12/139,054 on Sep. 29, 2010.

* cited by examiner

$$\varepsilon d = Bd(\theta) \times Iq* + Bq(\theta) \times Id*$$
$$\varepsilon q = Bq(\theta) \times Iq* - Bd(\theta) \times Id*$$

Fig.4

MOTOR CONTROLLER AND ELECTRIC POWER STEERING APPARATUS

This application is based on and claims priority from Japanese Patent Application No. 2007-046104 filed on Feb. 26, 2007, the entire contents of which are incorporated herein by reference.

BACKGROUND OF THE INVENTION

The present invention relates to a motor controller and an electric power steering apparatus.

Conventionally, a power steering apparatus for a vehicle includes an electric power steering apparatus (EPS) provided with a motor as a drive source. The EPS has a lot of flexibility in the arrangement and an energy consumption is small in comparison with a hydraulic power steering apparatus. Accordingly, in recent years, the use of the EPS in many kinds of vehicles has been studied.

A motor has inherently has a fluctuation of an output torque, such as a cogging torque, a torque ripple caused by a distortion of an induced voltage waveform generated in a motor coil or the like. However, in the EPS, the fluctuation of the output torque mentioned above is reflected directly in a steering feeling. Accordingly, in the motor controller for the EPS, a lot of torque ripple countermeasures have been conventionally proposed.

For example, Japanese Laid-Open Patent Publication No. 2004-328814 discloses a motor controller generating a motor control signal on the basis of a current feedback control of a d/q coordinate system. This motor controller uses each of correction coefficients relating to a d-axis and a q-axis per an rotation angle of the motor computed on the basis of an actually measured data of the induced voltage waveform at a time of rotating the motor at a constant speed. Further, a d-axis current command value and a q-axis current command value are corrected by adding a d-axis correction amount and a q-axis correction amount corresponding to the rotation angle and computed on the basis of each of the correction coefficients to a d-axis current command value and a q-axis current command value corresponding to a target value of the current feedback control.

In other words, if a value of the induced voltage generated in each of phases due to the rotation of the motor per unit rotation angular velocity is known in each of the rotation angles (electric angles), it is possible to suppress the fluctuation of the output torque even in the case where the distortion is generated in the induced voltage waveform. That is, it is possible to determine a current value of each of the phases that does not generate any torque ripples.

For example, if the induced voltage value per unit rotation angular velocity (a unit induced voltage value) is set as in an expression (1) shown below, it is possible to determine, in accordance with the following expressions (2) to (4), the current value of each of the phases for preventing the torque ripple from being generated due to the distortion of the induced voltage waveform under a constraint condition in which a heat generation of the motor becomes minimum.

Expression $$e_{0u} = \frac{e_u}{\omega_m}, e_{0v} = \frac{e_v}{\omega_m}, e_{0w} = \frac{e_w}{\omega_m} \quad (1)$$

$$I_u = \frac{(e_{0u} - e_{0v}) + (e_{0v} - e_{0w})}{(e_{0u} - e_{0v})^2 + (e_{0v} - e_{0w})^2 + (e_{0w} - e_{0u})^2} T \quad (2)$$

$$I_v = \frac{(e_{0v} - e_{0w}) + (e_{0v} - e_{0u})}{(e_{0u} - e_{0v})^2 + (e_{0v} - e_{0w})^2 + (e_{0w} - e_{0u})^2} T \quad (3)$$

$$I_w = \frac{(e_{0w} - e_{0u}) + (e_{0w} - e_{0v})}{(e_{0u} - e_{0v})^2 + (e_{0v} - e_{0w})^2 + (e_{0w} - e_{0u})^2} T \quad (4)$$

in which e0u, e0v, e0w represent unit induced voltage values for each phase, eu, ev, ew represent induced voltage waveforms for each phase (induced voltage values), ωm represents rotation angular velocities (mechanical angles), Iu, Iv, Iw represent current values for each phase, and T represents motor torque.

Accordingly, in the structure for carrying out the current feedback control of the d/q coordinate system, the d-axis current command value and the q-axis current command value may be computed by mapping (d/q conversion) the expressions (2) to (4) into the d/q coordinate.

Specifically, the expressions (2) to (4) are first transformed to the following expressions (5) to (7) and (8) to (10).

Expression $$I_u = A_u(\theta) K_t I_q^* \quad (5)$$

$$I_v = A_v(\theta) K_t I_q^* \quad (6)$$

$$I_w = A_w(\theta) K_t I_q^* \quad (7)$$

$$A_u(\theta) = \frac{(e_{0u} - e_{0v}) + (e_{0v} - e_{0w})}{(e_{0u} - e_{0v})^2 + (e_{0v} - e_{0w})^2 + (e_{0w} - e_{0u})^2} \quad (8)$$

$$A_v(\theta) = \frac{(e_{0v} - e_{0w}) + (e_{0v} - e_{0u})}{(e_{0u} - e_{0v})^2 + (e_{0v} - e_{0w})^2 + (e_{0w} - e_{0u})^2} \quad (9)$$

$$A_w(\theta) = \frac{(e_{0w} - e_{0u}) + (e_{0w} - e_{0v})}{(e_{0u} - e_{0v})^2 + (e_{0v} - e_{0w})^2 + (e_{0w} - e_{0u})^2} \quad (10)$$

in which, θ represents rotation angle (electric angle, Kt represents torque constant, and Iq* represents q-axis current command value.

Further, by d/q converting the expressions (5) to (7), it is possible to obtain the following expressions (11) and (12) as arithmetic expressions of a d-axis current command value Id0 and a q-axis current command value Iq0 for preventing torque ripple from being generated due to distortion of the induced voltage waveform.

Expression $$I_{d0} = \sqrt{\frac{2}{3}} \left\{ A_u(\theta)\cos\theta + A_v(\theta)\cos\left(\theta - \frac{2}{3}\pi\right) + A_w(\theta)\cos\left(\theta + \frac{2}{3}\pi\right) \right\} K_t I_q^* \quad (11)$$

$$I_{q0} = \sqrt{\frac{2}{3}} \left\{ A_u(\theta)\sin\theta + A_v(\theta)\sin\left(\theta - \frac{2}{3}\pi\right) + A_w(\theta)\sin\left(\theta + \frac{2}{3}\pi\right) \right\} K_t I_q^* \quad (12)$$

in which the expressions (11) and (12) can be further transformed into the following expressions (13) and (14), and (15) and (16).

Expression $$I_{d0} = B_d(\theta) \times I_q \quad (13)$$

$$I_{q0} = B_q(\theta) \times I_q^* + I_q^* \quad (14)$$

$$B_d(\theta) = \sqrt{\frac{2}{3}} K_t \left\{ A_u(\theta)\cos\theta + A_v(\theta)\cos\left(\theta - \frac{2}{3}\pi\right) + A_w(\theta)\cos\left(\theta + \frac{2}{3}\pi\right) \right\} \quad (15)$$

$$B_q(\theta) = \quad (16)$$
$$-1 - \sqrt{\frac{2}{3}} K_t \left\{ A_u(\theta)\sin\theta + A_v(\theta)\sin\left(\theta - \frac{2}{3}\pi\right) + A_w(\theta)\sin\left(\theta + \frac{2}{3}\pi\right) \right\}$$

In other words, on the assumption that a d-axis noninteracting control is executed (Id*=0), the d-axis current command value Id0 and the q-axis current command value Iq0 can be determined by respectively adding the corresponding d-axis correction amount ($\epsilon d = Bd(\theta) \times Iq^*$) and the q-axis correction amount ($\epsilon q = Bq(\theta) \times Iq^*$) to an original d-axis current command value Id* (Id*=0) and an original q-axis current command value Iq*.

Practically, first, the induced voltage values per unit rotation angular velocity for each rotation angle, that is, the unit induced voltage values e0u, e0v, and e0w are determined by measuring induced voltage waveforms (eu, ev, ew) of the respective phases at a time of rotating the motor at a constant speed, and dividing the measured value by the rotation angular velocity ωm (the mechanical angular velocity) at a time of rotating at the constant speed (refer to the expression (1)). Next, a map in which the rotation angle θ is associated with each of a d-axis correction coefficient Bd(θ) and a q-axis correction coefficient Bq(θ) is formed by computing the d-axis correction coefficient Bd(θ) and the q-axis correction coefficient Bq(θ) for each rotation angle θ on the basis of each of the unit induced voltage values e0u, e0v, and e0w, and the expressions (8) to (10), (15) and (16).

At the time of controlling the motor, the d-axis correction amount εd and the q-axis correction amount εq corresponding to the rotation angle θ are computed by referring to a map which is previously prepared and stored in a memory area (ROM), and the d-axis correction amount εd and the q-axis correction amount εq are added to the original d-axis current command value Id* and q-axis current command value Iq*. Further, it is possible to suppress the generation of torque ripple caused by distortion of the induced voltage waveform by executing the electric feedback control on the basis of the corrected d-axis current command value Id0 and q-axis current command value Iq0.

In the EPS, there is a case where the rotation of the motor is demanded in a high-speed region over a base speed at a time when a quick steering operation is generated or the like. As a method of ensuring a following capability at a time of steering at a high speed, there is a field weakening control setting the d-axis current command value to a negative value in correspondence to the rotation angular velocity of the motor. In other words, a magnetic flux in a direction of the d-axis in which a magnetic flux of a permanent magnet exists, is reduced by utilizing a demagnetizing electromotive force caused by a d-axis armature reaction generated by applying the d-axis current in the negative direction. Accordingly, an operating region of the motor is enlarged to a high-speed region over the base speed.

However, since the apparatus according to the prior art is structured on the assumption that the d-axis noninteracting control is executed (Id*=0), the prior art apparatus cannot correspond to the field weakening control mentioned above. In other words, the phase of each of the phase currents is deviated from the original phase through the execution of the field weakening control. Accordingly, it is impossible to properly correct the d-axis and q-axis current command values at a time of the field weakening control, and the generation of torque ripple is unavoidable.

SUMMARY OF THE INVENTION

An objective of the present invention is to provide a motor controller and an electric power steering apparatus which effectively suppress the generation of torque ripple caused by distortion of an induced voltage waveform even at a time of executing a field weakening control.

To achieve the foregoing objective and in accordance with a first aspect of the present invention, a motor controller controlling a motor having a plurality of phases and provided with a plurality of motor coils each corresponding to one of the phases is provided. The motor controller includes computing means, signal generating means, and correcting means. The computing means computes, as current command values for controlling the motor, a d-axis current command value and a q-axis current command value of a d/q coordinate system. The signal generating means converts detected current values of the phases of the motor into the d-axis current value and the q-axis current value of the d/q coordinate system, and generates a motor control signal by executing a feedback control in such a manner as to cause the d-axis current value and the q-axis current value to follow the computed d-axis current command value and q-axis current command value. The correcting means corrects the d-axis current command value and the q-axis current command value in such a manner as to suppress a torque ripple caused by a distortion of an induced voltage waveform generated in the motor coil in each of the phases. The correcting means has, per rotation angle of the motor, correction coefficients each relating to one of the d axis and the q axis computed on the basis of a actually measured data of the induced voltage waveform. The correcting means executes the correction by adding, to the d-axis current command value and the q-axis current command value, a d-axis correction amount and a q-axis correction amount corresponding to the rotation angle computed on the basis of each of the correction coefficients. The correcting means computes the d-axis correction amount by adding a second term obtained by multiplying the correction coefficient relating to the q-axis by the d-axis current command value to a first term obtained by multiplying the correction coefficient relating to the d-axis by the q-axis current command value. The correcting means computes the q-axis correction amount by subtracting a second term obtained by multiplying the correction coefficient relating to the d-axis by the d-axis current command value from a first term obtained by multiplying the correction coefficient relating to the q-axis by the q-axis current command value.

In accordance with a second aspect of the present invention, an electric power steering apparatus having the motor controller according to the first aspect is provided.

DETAILED DESCRIPTION OF THE PREFERRED EMBODIMENTS

A description will be given below of an electric power steering apparatus (EPS) according to one embodiment of the present invention with reference to the accompanying drawings.

Figure 1:
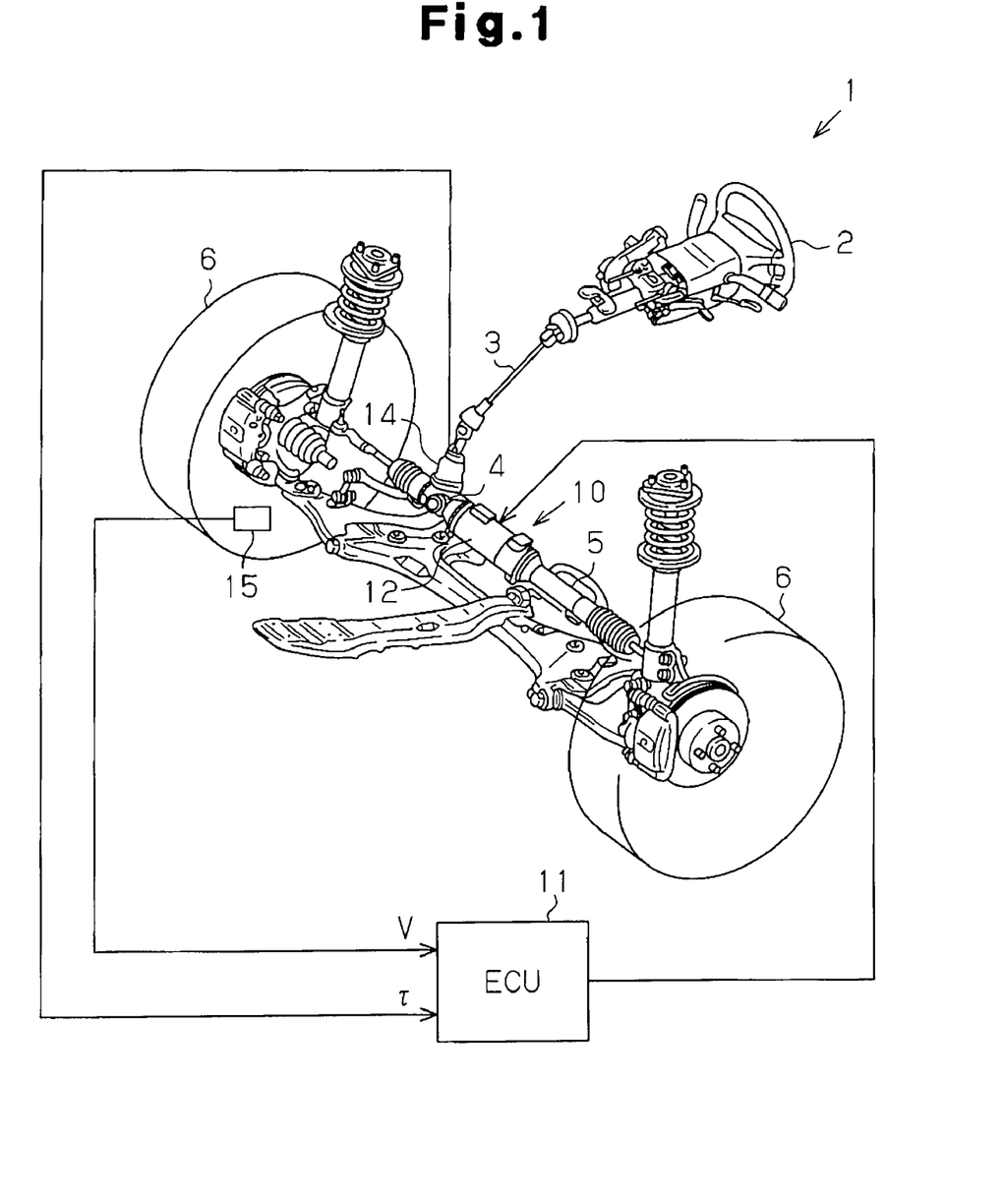
FIG. 1 is a schematic view of the structure of an electric power steering apparatus.

As shown in FIG. 1, a steering shaft 3 is fixed to a steering wheel 2. The steering shaft 3 is coupled to a rack 5 by a rack and pinion mechanism 4. Rotation of the steering shaft 3 accompanying a steering operation is converted into a linear reciprocation of the rack 5 by the rack and pinion mechanism 4. Further, the steering angle of steerable wheels 6 is changed on the basis of the linear reciprocation of the rack 5.

The EPS 1 is provided with an EPS actuator 10 and an ECU 11. The EPS actuator 10 is a steering force assisting device applying an assist force for assisting a steering operation to a steering system. The ECU 11 is control means controlling the actuation of the EPS actuator 10.

The EPS actuator 10 is a rack type EPS actuator in which a motor 12 serving as a drive source is arranged coaxially with the rack 5. In the EPS actuator 10, an assist torque generated by the motor 12 is transmitted to the rack 5 via a ball screw mechanism (not shown). The motor 12 is a brushless motor, and is driven by a three-phase (U, V and W) drive power supplied from the ECU 11. The ECU 11 serving as a motor controller controls an assist force applied to the steering system by controlling the assist torque generated in the motor 12 (power assist control).

A torque sensor 14 and a vehicle speed sensor 15 are connected to the ECU 11. The ECU 11 executes the actuation of the EPS actuator 10, that is, power assist control, on the basis of a steering torque τ detected by the torque sensor 14, and a vehicle speed V detected by the vehicle speed sensor 15.

Next, a description will be given of the electric configuration of the EPS 1 in accordance with the present embodiment.

Figure 2:
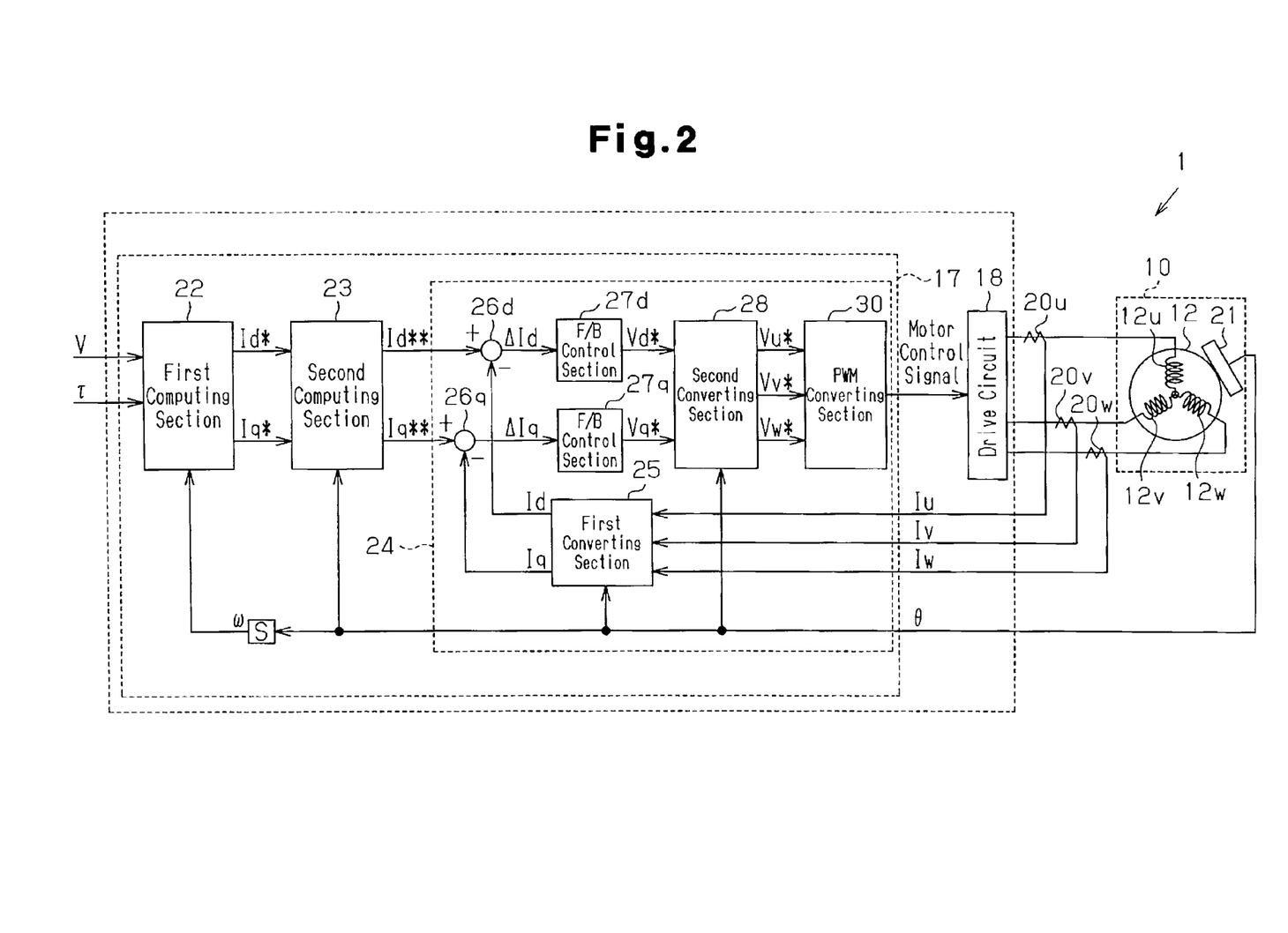
FIG. 2 is a block diagram showing the electric configuration of the electric power steering apparatus.

As shown in FIG. 2, the ECU 11 is provided with a microcomputer 17 and a drive circuit 18. The microcomputer 17 is motor control signal output means outputting a motor control signal. The drive circuit 18 feeds a three-phase drive power to the motor 12 on the basis of the motor control signal.

The drive circuit 18 is a known PWM inverter structured such that a pair of switching elements connected in series are set as a basic unit (arm), and three arms corresponding to the respective phases are connected in parallel. A motor control signal output from the microcomputer 17 defines an ON duty ratio of each of the switching elements constructing the drive circuit 18. The motor control signal is applied to a gate terminal of each of the switching elements, and each of the switching elements is turned on and off in response to the motor control signal. Accordingly, a DC voltage of an on-vehicle power source (not shown) is converted into a three-phase (U, V, W) drive power fed to the motor 12.

The ECU 11 is connected to current sensors 20u, 20v, and 20w for detecting each of the phase current values Iu, Iv, and Iw applied to the motor 12, and a rotation angle sensor 21 for detecting an rotation angle θ of the motor 12. The microcomputer 17 outputs a motor control signal to the drive circuit 18 on the basis of the each of the phase current values Iu, Iv and Iw of the motor 12 detected on the basis of the output signal of each of the sensors, and the rotation angle θ, the steering torque τ, and the vehicle speed V.

The microcomputer 17 is provided with a first computing section 22 serving as computing means computing a current command value as a control target amount of the assist force applied to the steering system, and a signal generating section 24 serving as signal generating means generating a motor control signal on the basis of a current command value calculated by the first computing section 22.

The first computing section 22 computes a d-axis current command value Id* and a q-axis current command value Iq* on the basis of the steering torque τ and the vehicle speed V detected by the torque sensor 14 and the vehicle speed sensor 15. The first computing section 22 outputs "0" as the d-axis current command value Id* in the case where the field weakening control is not executed (Id*=0). Further, the microcomputer 17 is provided with a second computing section 23 executing a compensation control for suppressing a generation of a torque ripple. The d-axis current command value Id* and the q-axis current command value Iq* output by the first computing section 22 are input to the second computing section 23. The second computing section 23 outputs a d-axis current command value Id and a q-axis current command value Iq corrected in accordance with the compensation control to the signal generating section 24. In this case, as is known, the d/q coordinate system refers to a rotational coordinate system defined by a d-axis and a q-axis q, for example, in which a direction heading for an N pole from an S pole of the rotor is defined as the d-axis, and an axis orthogonal to the d-axis is defined as the q-axis.

The signal generating section 24 receives each of the phase current values Iu, Iv and Iw detected by the current sensors 20u, 20v and 20w, and the rotation angle θ detected by the rotation angle sensor 21, as well as the d-axis current command value Id and the q-axis current command value Iq. The signal generating section 24 generates the motor control signal by executing a current feedback control in the d/q coordinate system on the basis of each of the phase current values Iu, Iv and Iw and the rotation angle θ (the electric angle).

In other words, in the signal generating section 24, each of the phase current values Iu, Iv and Iw is input to a first converting section 25 serving as a three phase/two phase converting section together with the rotation angle θ, and is converted into the d-axis current value Id and the q-axis current value Iq of the d/q coordinate system by the first converting section 25. Further, the q-axis current command value Iq input to the signal generating section 24 is input to a subtractor 26q together with the q-axis current value Iq, and the d-axis current command value Id is input to a subtractor 26d together with the d-axis current value Id. A d-axis current deviation ΔId and a q-axis current deviation ΔIq computed in the respective subtractors 26d and 26q are input to corresponding F/B control sections 27d and 27q. In each of the F/B control sections 27d and 27q, feedback control is carried out for making the d-axis current value Id and the q-axis current value Iq corresponding to an actual current follow to the d-axis current command value Id and the q-axis current command value Iq corresponding to a control target value, respectively.

Specifically, the F/B control sections 27d and 27q respectively compute a d-axis voltage command value Vd* and a q-axis voltage command value Vq* by multiplying the input d-axis current deviation ΔId and q-axis current deviation ΔIq by a predetermined F/B gain (PI gain). The d-axis voltage command value Vd* and the q-axis voltage command value Vq* computed by the F/B control sections 27d and 27q are input to a second converting section 28 serving as a two phase/three phase converting section together with the rotation angle θ, and are converted into three phases of voltage command values Vu*, Vv* and Vw* in the second converting section 28.

Each of the voltage command values Vu*, Vv* and Vw* computed in the second converting section 28 is input to a PWM converting section 30, and a duty command value corresponding to each of the voltage command values Vu*, Vv* and Vw* is generated in the PWM converting section 30. The signal generating section 24 generates a motor control signal having an ON duty ratio indicated by each of the duty command value. The microcomputer 17 controls an actuation of the drive circuit 18, that is, the feed of the drive power to the motor 12, by outputting the motor control signal to each of (gate terminals of) switching elements of the drive circuit 18.

In the present embodiment, the rotation angular velocity ω of the motor 12 is input to the first computing section 22. Further, the first computing section 22 executes the field weakening control having the d-axis current command value Id* as the negative value in correspondence to the input rotation angular velocity ω. In other words, a back electromotive force generated in the motor coils 12u, 12V and 12w in each of the phases is increased in accordance with an increase of the rotation angular velocity ω of the motor 12. Accordingly, an upper limit (a base speed) exists in the rotating speed of the motor. However, since the d-axis current in the negative direction is applied by setting the d-axis current command value Id* to the negative value, it is possible to reduce the magnetic flux in the d-axis direction by utilizing a demagnetizing electromotive force caused by the d-axis armature reaction. In other words, an operating range of the motor 12 is expanded to a high speed region over the base speed, by executing the field weakening control in correspondence to the rotation angular velocity ω of the motor 12.

(Torque Ripple Compensation Control)

Next, a description will be given of torque ripple compensation control by the second computing section 23.

As shown in FIG. 2, the second computing section 23 receives the rotation angle θ, together with the d-axis current command value Id* and the q-axis current command value Iq* output from the first computing section 22. The second computing section 23 serving as the correcting means executes a compensation control for suppressing the generation of the torque ripple caused by distortion of the induced voltage waveform, on the basis of the d-axis current command value Id* and the q-axis current command value Iq*, and the rotation angle θ (torque ripple compensation control).

Figure 3:
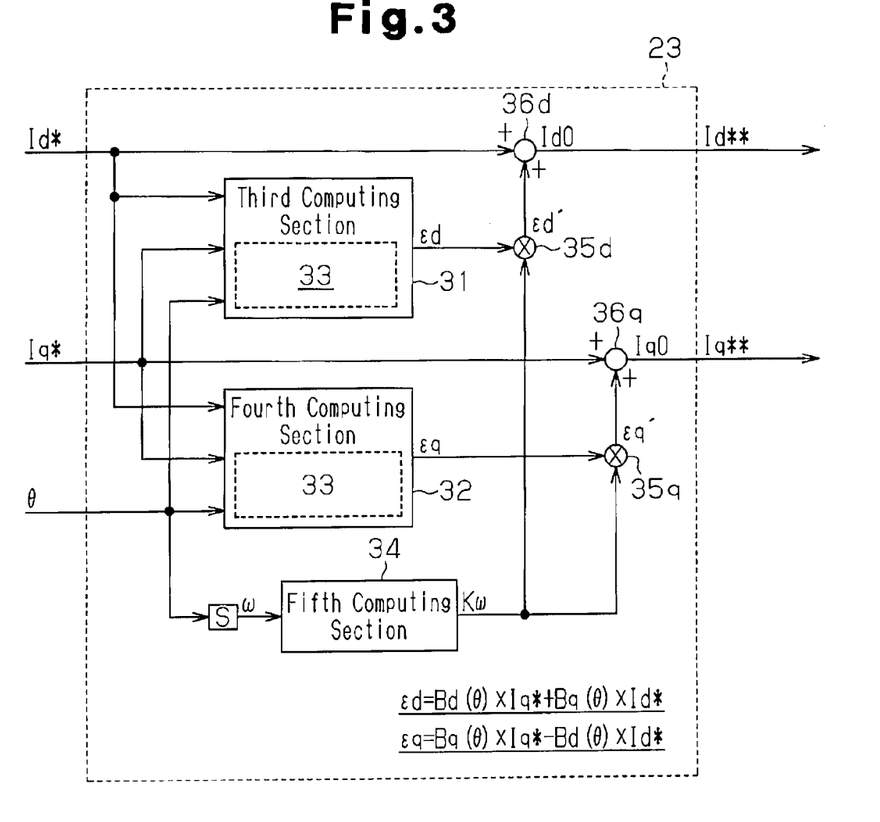
FIG. 3 is a block diagram schematically showing the structure of a second computing section.

Describing in detail, as shown in FIG. 3, the second computing section 23 is provided with third and fourth computing sections 31 and 32 for computing a d-axis correction amount εd and a q-axis correction amount εq as compensation components for suppressing the generation of torque ripple. The second computing section 23 corrects the d-axis current command value Id* and the q-axis current command value Iq* by adding the d-axis correction amount E d and the q-axis correction amount εq to the corresponding d-axis current command value Id* and q-axis current command value Iq*, and computes the d-axis current command value Id0 and the q-axis current command value Iq0 for preventing torque ripple from being generated by the distortion of the induced voltage waveform.

Describing further in detail, the d-axis current command value Id* and the q-axis current command value Iq*, and the rotation angle θ are input to the third computing section 31 and the fourth computing section 32. The third computing section 31 and the fourth computing section 32 are each provided with a map 33 in which the rotation angle θ, and a d-axis correction coefficient Bd(θ), and a q-axis correction coefficient Bq(θ) are associated. The third and fourth computing sections 31 and 32 compute the d-axis correction coefficient Bd(θ) and the q-axis correction coefficient Bq(θ) corresponding to the rotation angle θ, by referring to the rotation angle θ to the map 33.

The map 33 is previously formed by using the expressions (1), (8) to (10), (15) and (16) on the basis of the actually measured data of the induced voltage waveform, and is stored in the memory area of the microcomputer 17. The third computing section 31 and the fourth computing section 32 compute the d-axis correction amount εd and the q-axis correction amount εq in accordance with the following expressions (17) and (18), on the basis of the d-axis correction coefficient Bd(θ) and the q-axis correction coefficient Bq(θ) corresponding to the rotation angle θ.

Expression $$\epsilon_d = B_d(\theta) \times I_q + B_q(\theta) \times I_d^* \qquad (17)$$

$$\epsilon_q = B_q(\theta) \times I_q^* - B_d(\theta) \times I_d^* \qquad (18)$$

In other words, the third computing section 31 and the fourth computing section 32 compute the d-axis correction amount εd and the q-axis correction amount εq on the basis of an arithmetic expression constituted by a first term obtained by multiplying the correction coefficient relating to an object axis by the q-axis current command value Iq*, and a second term obtained by multiplying the correction coefficient relating to the other axis, or an auxiliary axis, by the d-axis current command value Id*.

In the third computing section 31, the object axis is the d axis and the auxiliary axis is the q axis, and in the fourth computing section 32, the object axis is the q axis and the auxiliary axis is the d axis. In other words, in the third computing section 31, the correction coefficient of the first term is the d-axis correction coefficient Bd(θ), and the correction coefficient of the second term is the q-axis correction coefficient Bq(θ). In the fourth computing section 32, the correction coefficient of the first term is the q-axis correction coefficient Bq(θ), and the correction coefficient of the second term is the d-axis correction coefficient Bd(θ).

Further, the second computing section 23 is provided with a fifth computing section 34 for computing a speed gain Kω for suppressing the generation of torque ripple caused by a computation cycle difference between the compensation control by the second computing section 23 and the current feedback control by the signal generating section 24. The rotation angular velocity ω of the motor 12 is input to the fifth computing section 34. The fifth computing section 34 computes the speed gain Kω corresponding to the input rotation angular velocity ω. The fifth computing section 34 computes such a speed gain Kω as to reduce the d-axis correction amount εd and the q-axis correction amount εq added to the q-axis current command value Iq* and the d-axis current command value Id* as the rotation angular velocity ω becomes higher, in the case where an absolute value of the input rotation angular velocity ω exceeds a predetermined speed ω0.

Generally, there is a constraint on a computing power, in the computing device (the microcomputer) used in the motor controller. Accordingly, in many cases, a computation cycle difference exists between the current feedback control and the compensation control. Therefore, in the case where the motor 12 rotates at a high speed, for example, at high speed steering, there is a case where a deviation is generated in a phase of the compensation control, and the current command value cannot be correctly compensated. In the present embodiment, in the case mentioned above, the generation of torque ripple caused by an erroneous compensation in the deviated phase state is suppressed by reducing the correction amount relating to the d-axis current command value Id* and the q-axis current command value Iq*.

Figure 4:
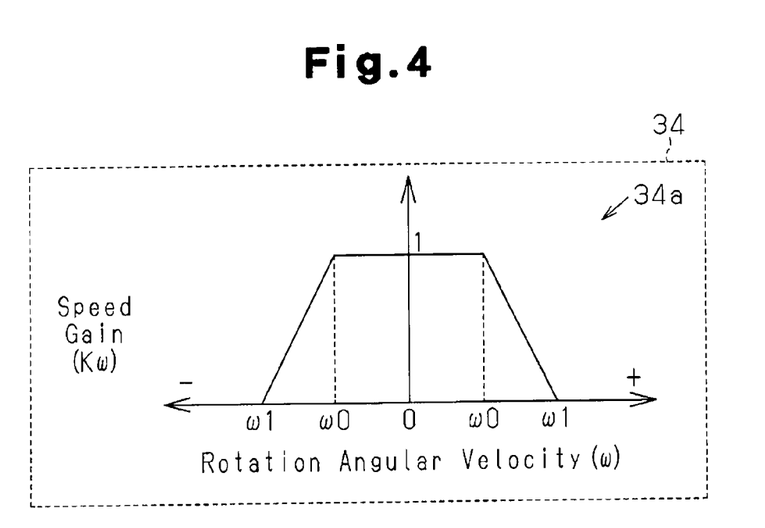
FIG. 4 is a schematic view showing a fifth computing section.

The fifth computing section 34 is provided with a map 34a in which the rotation angular velocity ω and the speed gain Kω are associated (refer to FIG. 4). In the map 34a, the speed gain Kω is set such as to come to "1" in the case where the absolute value of the rotation angular velocity ω is equal to or less than a predetermined speed ω0 (|ω|≦ω0), and to come to "0" in the case where it is equal to or more than a predetermined speed ω1 (|ω|≧ω1). In the map 34a, in the case where the absolute value of the rotation angular velocity ω is higher than the predetermined speed ω0, and lower than the predetermined speed ω1 (ω0<|ω|<ω1), the speed gain Kω is set to be smaller as the rotation angular velocity ω becomes higher, that is, to such a value as to more greatly reduce the d-axis correction amount εd and the q-axis correction amount εq. The fifth computing section 34 computes the speed gain Kω corresponding to the input rotation angular velocity ω by referring to the map 34a.

The speed gain Kω computed in the fifth computing section 34 is input to multipliers 35d and 35q, and the multipliers 35d and 35q multiply, by the speed gain Kω, the d-axis correction amount εd output by the third computing section 31 and the q-axis correction amount εq output by the fourth computing section 32, respectively.

Next, the corrected d-axis compensation amount εd' multiplied by the speed gain Kω is added to the d-axis current command value Id* in an adder 36d. In the same manner, the corrected q-axis compensation amount εq' is added to the q-axis current command value Iq* in an adder 36q. Accordingly, it is possible to compute the d-axis current command value Id0 and the q-axis current command value Iq0 which can suppress the torque ripple caused by the distortion of the induced voltage waveform.

The second computing section 23 outputs to the signal generating section 24 the corrected d-axis current command value Id0 and q-axis current command value Iq0 as the d-axis current command value Id and the q-axis current command value Iq.

(Verification)

Next, advantages of the torque ripple compensation control in accordance with the present embodiment will be verified.

The corrected d-axis current command value Id0 and q-axis current command value Iq0 obtained by adding the d-axis correction amount εd and the q-axis correction amount εq determined in accordance with the expressions (17) and (18) are expressed by the following expressions (19) and (20).

Expression $$I_{d0} = B_d(\theta) \times I_q + B_q(\theta) \times I_d + I_d^* \quad (19)$$

$$I_{q0} = B_q(\theta) \times I_q^* + I_q - B_d(\theta) \times I_d \quad (20)$$

The following expressions (21) and (22) are obtained by substituting the expressions (1), (8) to (10), (15) and (16) into the expressions (19) and (20) and simplifying the expressions.

Expression

Further, the following expressions (23) to (25) are obtained by d/q inverse converting the expressions (21) and (22) so as to express the respective phase current command values Iu*, Iv* and Iw*.

Expression $$I_u^* = \frac{2K_t\omega_m I_q^* e_u + K_t\omega_m(-I_q^* + \sqrt{3}\,I_d^*)e_v + K_t\omega_m(-I_q^* + \sqrt{3}\,I_d^*)e_w}{(e_u - e_v)^2 + (e_v - e_w)^2 + (e_w - e_u)^2} \quad (23)$$

$$I_v^* = \frac{K_t\omega_m(-I_q^* - \sqrt{3}\,I_d^*)e_u + 2K_t\omega_m I_q^* e_v + K_t\omega_m(-I_q^* + \sqrt{3}\,I_d^*)e_w}{(e_u - e_v)^2 + (e_v - e_w)^2 + (e_w - e_u)^2} \quad (24)$$

$$I_w^* = \frac{K_t\omega_m(-I_q^* + \sqrt{3}\,I_d^*)e_u + K_t\omega_m(-I_q^* - \sqrt{3}\,I_d^*)e_v + 2K_t\omega_m I_q^* e_w}{(e_u - e_v)^2 + (e_v - e_w)^2 + (e_w - e_u)^2} \quad (25)$$

A relational expression shown by an expression (27) is obtained by substituting the expressions (23) to (25) for the following expression (26) (a relational expression of the torque) and simplifying the expressions.

Expression $$T = \frac{I_u e_u + I_v e_v + I_w e_w}{\omega_m} \quad (26)$$

$$T = \frac{I_u e_u + I_v e_v + I_w e_w}{\omega_m} = K_t I_q^* \quad (27)$$

Accordingly, distortion of the induced voltage waveform is corrected regardless of the type of harmonic component contained in the induced voltage waveform, by executing the torque ripple compensation control in accordance with the present embodiment. As a result, the generation of torque ripple is effectively suppressed regardless whether the field weakening control is executed.

As mentioned above, in accordance with the present embodiment, the following operations and advantages are obtained.

(1) The second computing section 23 executing the compensation control is provided with the third computing section 31 computing the d-axis correction amount εd, and the fourth computing section 32 computing the q-axis correction amount εq. The computing sections 31 and 32 compute the d-axis correction coefficient Bd(θ) and the q-axis correction coefficient Bq(θ) corresponding to the rotation angle θ, by referring to the map 33. The computing sections 31 and 32

$$I_{d0} = \frac{1}{2} \times \frac{2\sqrt{6}\,K_t\omega_m(I_q^*\cos\theta - I_d^*\sin\theta)e_u + K_t\omega_m\begin{pmatrix}3\sqrt{2}\,I_d^*\cos\theta - \sqrt{6}\,I_q^*\cos\theta + \\ \sqrt{6}\,I_d^*\sin\theta + 3\sqrt{2}\,I_q^*\sin\theta\end{pmatrix}e_v + K_t\omega_m\begin{pmatrix}-3\sqrt{2}\,I_q^*\sin\theta - 3\sqrt{2}\,I_d^*\cos\theta + \\ \sqrt{6}\,I_q^*\cos\theta + \sqrt{6}\,I_d^*\sin\theta\end{pmatrix}e_w}{(e_u - e_v)^2 + (e_v - e_w)^2 + (e_w - e_u)^2} \quad (21)$$

$$I_{q0} = \frac{1}{2} \times \frac{-2\sqrt{6}\,K_t\omega_m(I_q^*\sin\theta + I_d^*\cos\theta)e_u + K_t\omega_m\begin{pmatrix}-3\sqrt{2}\,I_d^*\sin\theta + \sqrt{6}\,I_q^*\sin\theta + \\ \sqrt{6}\,I_d^*\cos\theta + 3\sqrt{2}\,I_q^*\cos\theta\end{pmatrix}e_v + K_t\omega_m\begin{pmatrix}-3\sqrt{2}\,I_q^*\cos\theta + 3\sqrt{2}\,I_d^*\sin\theta + \\ \sqrt{6}\,I_q^*\sin\theta + \sqrt{6}\,I_d^*\cos\theta\end{pmatrix}e_w}{(e_u - e_v)^2 + (e_v - e_w)^2 + (e_w - e_u)^2} \quad (22)$$

compute the d-axis correction amount εd and the q-axis correction amount εq on the basis of the arithmetic expression constituted by the first term obtained by multiplying the correction coefficient relating to the object axis by the q-axis current command value Iq* and the second term obtained by multiplying the correction coefficient relating to the auxiliary axis by the d-axis current command value Id*. The second computing section 23 computes the d-axis current command value Id0 and the q-axis current command value Iq0 for preventing torque ripple from being generated due to the distortion of the induced voltage waveform, by adding the d-axis correction amount εd and the q-axis correction amount εq to the corresponding d-axis current command value Id* and q-axis current command value Iq*.

In accordance with the structure mentioned above, distortion of the induced voltage waveform is corrected regardless of the type of harmonic component contained in the induced voltage waveform. As a result, it is possible to effectively suppress the generation of torque ripple regardless whether the field weakening control is executed.

(2) The second computing section 23 is provided with the fifth computing section 34 computing the speed gain Kω. The fifth computing section 34 computes the speed gain Kω corresponding to the rotation angular velocity ω of the motor 12. In the case where the absolute value of the rotation angular velocity ω exceeds the predetermined speed ω0, the fifth computing section 34 computes the speed gain Kω in such a manner as to reduce the d-axis correction amount εd and the q-axis correction amount εq added to the d-axis current command value Id* and the q-axis current command value Iq* as the rotation angular velocity ω becomes higher.

Generally, the computing device (the microcomputer) used in the motor controller has the constraint on the computing power. Accordingly, in many cases, the computation cycle difference exists between the current feedback control and the compensation control. Therefore, in the case where the motor 12 is rotated at a high speed, for example, at high speed steering, there is a case where the deviation is generated in the phase of the compensation control, and it is impossible to correctly compensate for the current command value. However, in accordance with the structure mentioned above, the correction amount in the compensation control is reduced in the condition in which the deviation is generated in the phase as mentioned above. As a result, it is possible to suppress the generation of the torque ripple caused by the erroneous compensation in the deviated phase state.

Further, since the motor controller mentioned above is provided, it is possible to effectively suppress the generation of torque ripple caused by the distortion of the induced voltage waveform even at a time of executing the field weakening control. Accordingly, it is possible to provide the electric power steering apparatus which is excellent in the steering feeling.

The present embodiment may be modified as follows.

In the present embodiment, the present invention is embodied in the electric power steering apparatus (EPS), however, may be embodied in a motor controller which is used for intended uses other than the EPS.

In the present embodiment, the second computing section 23 is provided with the fifth computing section 34 computing the speed gain Kω. However, for example, in the case where the computation cycle difference does not exist between the current feedback control and the compensation control, it is not always necessary to provide the structure for reducing the correction amount in correspondence to the rotation angular velocity of the motor.

The invention claimed is:

1. A motor controller controlling a motor having a plurality of phases and provided with a plurality of motor coils each corresponding to one of the phases, the motor controller comprising:

computing means computing, as current command values for controlling the motor, a d-axis current command value and a q-axis current command value of a d/q coordinate system;

signal generating means converting detected current values of the phases of the motor into the d-axis current value and the q-axis current value of the d/q coordinate system, and generating a motor control signal by executing a feedback control in such a manner as to cause the d-axis current value and the q-axis current value to follow the computed d-axis current command value and q-axis current command value; and correcting means correcting the d-axis current command value and the q-axis current command value in such a manner as to suppress a torque ripple caused by a distortion of an induced voltage waveform generated in the motor coil in each of the phases, wherein the correcting means has, per rotation angle of the motor, correction coefficients each relating to one of the d axis and the q axis computed on the basis of a actually measured data of the induced voltage waveform, wherein the correcting means executes the correction by adding, to the d-axis current command value and the q-axis current command value, a d-axis correction amount and a q-axis correction amount corresponding to the rotation angle and computed on the basis of each of the correction coefficients, wherein the correcting means computes the d-axis correction amount by using an expression that consists of a first term obtained by multiplying the correction coefficient relating to the d-axis by the q-axis current command value and a second term obtained by multiplying the correction coefficient relating to the q-axis by the d-axis current command value, and wherein the correcting means computes the q-axis correction amount by using an expression that consists of a first term obtained by multiplying the correction coefficient relating to the q-axis by the q-axis current command value and a second term obtained by multiplying the correction coefficient relating to the d-axis by the d-axis current command value.

2. The motor controller according to claim 1, wherein the correcting means computes the d-axis correction amount and the q-axis correction amount on the basis of the following expressions:

Expression $$\varepsilon_d = B_d(\theta) \times I_q^* + B_q(\theta) \times I_d^*$$

$$\varepsilon_q = B_q(\theta) \times I_q^* - B_q(\theta) \times I_d^*$$

$$B_d(\theta) = \sqrt{\frac{2}{3}} K_t \left\{ A_u(\theta)\cos\theta + A_v(\theta)\cos\left(\theta - \frac{2}{3}\pi\right) + A_w(\theta)\cos\left(\theta + \frac{2}{3}\pi\right) \right\}$$

$$B_q(\theta) = -1 - \sqrt{\frac{2}{3}} K_t \left\{ A_u(\theta)\sin\theta + A_v(\theta)\sin\left(\theta - \frac{2}{3}\pi\right) + A_w(\theta)\sin\left(\theta + \frac{2}{3}\pi\right) \right\}$$

$$A_u(\theta) = \frac{(e_{0u} - e_{0v}) + (e_{0v} - e_{0w})}{(e_{0u} - e_{0v})^2 + (e_{0v} - e_{0w})^2 + (e_{0w} - e_{0u})^2}$$

$$A_v(\theta) = \frac{(e_{0v} - e_{0w}) + (e_{0v} - e_{0u})}{(e_{0u} - e_{0v})^2 + (e_{0v} - e_{0w})^2 + (e_{0w} - e_{0u})^2}$$

$$A_w(\theta) = \frac{(e_{0w} - e_{0u}) + (e_{0w} - e_{0v})}{(e_{0u} - e_{0v})^2 + (e_{0v} - e_{0w})^2 + (e_{0w} - e_{0u})^2}$$

$$e_{0u} = \frac{e_u}{\omega_m},\ e_{0v} = \frac{e_v}{\omega_m},\ e_{0w} = \frac{e_w}{\omega_m}$$

in which, $\epsilon_d$ represents the d-axis correction amount, $\epsilon_q$ represents the q-axis correction amount, $Bd(\theta)$ represents a d-axis correction coefficient, $Bq(\theta)$ represents a q-axis correction coefficient, Id* represents the d-axis current command value, Iq* represents the q-axis current command value, $\theta$ represents the rotation angle (electric angle), Kt represents a torque constant, $Au(\theta)$, $Av(\theta)$, $Aw(\theta)$ represent correction coefficients of respective phases, e0u, e0v, e0w represent unit induced voltage values each corresponding to one of the phases, eu, ev, ew represent induced voltage waveforms each corresponding to one of the phases, and $\omega_m$ represents a rotation angular velocity (mechanical angle).

3. The motor controller according to claim 1, wherein the correcting means computes a speed gain for suppressing the generation of a torque ripple caused by an computation cycle difference between compensation control for suppressing a torque ripple caused by distortion of the induced voltage waveform and feedback control in the signal generating means.

4. The motor controller according to claim 3, wherein the correcting means computes a speed gain corresponding to the rotation angular velocity of the motor.

5. The motor controller according to claim 4, wherein, in the case where the rotation angular velocity of the motor exceeds a predetermined speed, the correcting means computes such a speed gain as to reduce the d-axis correction amount and the q-axis correction amount as the rotation angular velocity becomes higher.

6. The motor controller according to claim 4, wherein the correcting means sets the speed gain to 1 in the case where the absolute value of the rotation angular velocity is equal to or less than a first value, and sets the speed gain to 0 in the case where the absolute value of the rotation angular velocity is equal to or more than a second value, which is greater than the first value.

7. The motor controller according to claim 6, wherein, in the case where the absolute value of the rotation angular velocity is greater than the first value and smaller than the second value, the correcting means computes such a speed gain as to reduce the d-axis correction amount and the q-axis correction amount as the rotation angular velocity becomes higher.

8. An electric power steering apparatus comprising the motor controller according to claim 1.

* * * * *